United States Patent
Berger et al.

(10) Patent No.: US 7,270,503 B2
(45) Date of Patent: Sep. 18, 2007

(54) CUTTING TOOL FOR ROTATING AND DRILLING INTO SOLID BLOCKS

(75) Inventors: Dietmar Berger, Lechaschau (AT); Rudolf Rofner, Heiterwang (AT); Remus Venturini, Rosshaupten (DE)

(73) Assignee: Ceratizit Austria GES. m.b.H., Reutte (AT)

( * ) Notice: Subject to any disclaimer, the term of this patent is extended or adjusted under 35 U.S.C. 154(b) by 0 days.

(21) Appl. No.: 10/530,967

(22) PCT Filed: Aug. 12, 2003

(86) PCT No.: PCT/AT03/00234

§ 371 (c)(1),
(2), (4) Date: May 9, 2005

(87) PCT Pub. No.: WO2004/016378

PCT Pub. Date: Feb. 26, 2004

(65) Prior Publication Data

US 2006/0078392 A1    Apr. 13, 2006

(30) Foreign Application Priority Data

Aug. 16, 2002  (AT)  .............................. GM550/2002

(51) Int. Cl.
   *B23B 27/04*     (2006.01)
   *B23B 27/16*     (2006.01)
(52) U.S. Cl. ........................ 408/199; 408/223; 82/114; 407/90; 407/113
(58) Field of Classification Search ................ 408/199, 408/223, 224, 713; 407/90, 103, 113, 117; 82/114
See application file for complete search history.

(56) References Cited

U.S. PATENT DOCUMENTS

| 1,585,000 | A | * | 5/1926 | Thomson ...................... 407/77 |
| 2,310,992 | A | * | 2/1943 | Proksa ........................ 408/197 |
| 2,773,672 | A | * | 12/1956 | Holmes et al. ............. 175/399 |
| 2,907,099 | A | * | 10/1959 | Dow ........................... 407/95 |

(Continued)

FOREIGN PATENT DOCUMENTS

DE    3204999 A1 *  8/1983

(Continued)

*Primary Examiner*—Monica Carter
*Assistant Examiner*—Michael W. Talbot
(74) *Attorney, Agent, or Firm*—Laurence A. Greenberg; Werner H. Stemer; Ralph E. Locher

(57) ABSTRACT

The invention relates to a cutting tool for rotating and drilling into solid blocks, comprising a drill shank (1) and a cutting head (2) on one end. The cutting head (2) has a straight, front-face cutting edge (4) extending approximately crosswise in relation to the drill axis (3). The cutting head (2) also comprises a section (8) protruding from the shank of the drill (1) at a height (h) ranging from at least 5% to a maximum of 40% of the diameter (d) of the drill and at a width (b) ranging from at least 5% to a maximum of 40% of the diameter (d) of the drill. The section (8) comprises a straight, lateral cutting edge (5) which merges into a straight, rear-sided cutting edge (7) extending in an approximately parallel manner in relation to the front-faced cutting edge (4).

10 Claims, 2 Drawing Sheets

U.S. PATENT DOCUMENTS

| | | | | |
|---|---|---|---|---|
| 3,250,154 | A * | 5/1966 | Breuning | 408/199 |
| 3,613,197 | A * | 10/1971 | Stier | 407/113 |
| 3,735,461 | A * | 5/1973 | Andrews, Sr. | 407/86 |
| 3,902,232 | A * | 9/1975 | Hertel | 407/104 |
| 4,087,194 | A * | 5/1978 | Takacs et al. | 408/199 |
| 4,233,867 | A * | 11/1980 | Zimmerman | 82/158 |
| 4,412,763 | A * | 11/1983 | Shallenberger, Jr. | 408/224 |
| 4,509,886 | A * | 4/1985 | Lindsay | 407/102 |
| 4,607,988 | A | 8/1986 | Salm et al. | |
| 4,674,924 | A * | 6/1987 | Carlsson et al. | 407/114 |
| 4,755,085 | A * | 7/1988 | Muren et al. | 407/113 |
| 5,259,709 | A * | 11/1993 | Hunt | 409/234 |
| 5,833,403 | A * | 11/1998 | Barazani | 407/101 |
| 6,048,140 | A * | 4/2000 | Johnson | 407/42 |
| 6,053,672 | A | 4/2000 | Satran et al. | |
| 6,168,356 | B1 * | 1/2001 | Sjoo et al. | 407/104 |
| 6,527,485 | B1 * | 3/2003 | Little | 407/24 |
| 6,582,163 | B2 * | 6/2003 | Hansson et al. | 407/110 |
| 6,612,207 | B2 * | 9/2003 | Schiffers | 82/1.11 |
| 6,688,816 | B1 * | 2/2004 | King et al. | 407/102 |
| 6,824,333 | B1 * | 11/2004 | King et al. | 407/102 |
| 6,918,717 | B2 * | 7/2005 | Ben-Mucha | 407/103 |
| 7,001,115 | B2 * | 2/2006 | Erickson et al. | 407/113 |

FOREIGN PATENT DOCUMENTS

| | | |
|---|---|---|
| EP | 0 385 280 A1 | 9/1990 |
| EP | 565907 A1 * | 10/1993 |
| GB | 2228695 A * | 9/1990 |
| JP | 10156604 A * | 6/1998 |
| JP | 2005212041 A * | 8/2005 |
| JP | 2006062070 A * | 3/2006 |
| JP | 2006181649 A * | 7/2006 |
| WO | WO 2005037472 A1 * | 4/2005 |

* cited by examiner

CUTTING TOOL FOR ROTATING AND DRILLING INTO SOLID BLOCKS

BACKGROUND OF THE INVENTION

Field of the Invention

The invention relates to a cutting tool for turning and boring into solid material, comprising a drill shank and a cutting head at one end having a straight, front cutting edge running substantially approximately transversely with respect to the drill axis, which cuts as far as the drill axis and forms an angle α of less than 90° with the latter, and an adjacent lateral cutting edge, cutting the wall of the bore, which forms an angle β of more than 90° with a perpendicular to the drill axis and which, in turn, merges into a straight, rear cutting edge which runs approximately parallel to the front cutting edge.

A cutting tool of this type, in which the cutting head is formed by a substantially rhombus-shaped or rhomboidal reversible cutting plate, is described in EP 0 642 859 A1, for example. A corresponding cutting tool is not suitable for boring into solid material, but can also carry out various turning operations, such as longitudinal turning, surface turning or copy turning. Piercing operations, such as internal or external piercing, cannot be carried out with such a tool.

EP 0 565 907 B1 describes a tool having a cylindrical shank and an interchangeable cutting element at one end. The cutting element has a laterally protruding section with a cutting edge running parallel to the tool axis, with which primarily recesses, for example internal recesses in relatively small bores, can be produced. By means of the particularly force-fitting and form-fitting clamping of the cutting element, grooves can also be hollowed out with such a cutting tool and even turning and milling work can be carried out. However, a cutting tool of this type is not suitable for producing bores in solid material.

German Utility Model DE 295 01 183 U1 likewise describes an internal piercing and turning tool having an interchangeable cutting element. The cutting element is designed as a round shank with a flat on one side for secure fixing in a tool holder and has a laterally protruding section at the end for carrying out piercing and turning operations. However, this cutting tool is not suitable for the production of bores in solid material either.

SUMMARY OF THE INVENTION

It is an object of the present invention to provide a cutting tool with which, firstly, it is possible to bore into solid material and with which, furthermore, piercing and turning operations can also be carried out.

According to the invention, this is achieved in that the lateral cutting edge is formed on a section of the cutting head which projects from the drill shank with a height in the range from at least 5% to at most 40% of the drill diameter and which has a width in the range from at least 5% to at most 40% of the drill diameter, the ratio of height to width lying in the range from 1:0.7 to 1:1.3, and in that the rear cutting edge forms an angle γ of less than 90° with the drill axis.

The invention therefore make provision, in the case of previously known cutting tools for internal piercing having projecting, lateral sections, also to form the end section running transversely with respect to the tool axis as a cutting edge, which means that such tools are also suitable for boring into solid material. In this case, it was surprising and not readily predictable that such projecting sections are able to withstand the high loadings which occur when boring into solid material without premature destruction of the cutting head. It is important in this case that the height and width of the projecting section lie within the defined limits in relation to the drill diameter. The fact that, following the lateral cutting edge, a rear cutting edge is provided as a straight cutting edge section, which runs approximately parallel to the front cutting edge, means that piercings can be widened and turned out as desired. The angle γ formed by this cutting edge section with the drill axis must in this case be smaller than 90°. In practice, a range from about 87° to 89.5° has proven to be worthwhile.

As a result of the configuration according to the invention of such cutting tools, as compared with previously known cutting tools, the multiplicity of possible machining operations is increased without the tool or the tool head having to be changed. As a result, shorter setup times, less effort on programming on the machine tool and lower storage costs, and therefore a considerable increase in productivity, are achieved.

It is particularly advantageous if the section projects from the drill shank with a height in the range of 5% to 30% and with a width in the range from 10% to 30% of the drill diameter.

In order to be able to operate well when boring and to achieve the flattest possible base of the bore without forming a pip at the center, it is advantageous if the front cutting edge runs continuously straight, at least as far as the drill axis. As a variant, the continuously straight front cutting edge can end before the drill axis and merge there into an adjacent section with an obtuse angle, which runs at least as far as the drill axis. In this case, although the central section of the cutting edge, which is particularly at risk of fracture, is reinforced, a pip in the shape of a truncated cone, which is often undesired, is formed at the center of the base of the bore.

Furthermore, it is advantageous if the front cutting edge forms an angle α of about 89.50° with the drill axis. A virtually flat base of the bore is therefore achieved and, nevertheless, it is ensured that the rake angle of the cutting edge, necessary for turning, such as surface turning, is adequately present.

Particularly beneficial cutting tools for piercing and for internal and external turning out are obtained if the lateral cutting edge is designed as a straight line which forms an angle β which lies in the region of about 91° with the perpendicular to the drill axis. If the angle β is as little more than 90° as possible, it is ensured that, firstly, the piercings have the flattest groove base possible and that, secondly, the minimum rake angle of the cutting edge necessary for turning out is still present. Given greater deviations from 90° up to an angle β of 140°, the lateral cutting edge is suitable in particular for undercutting threads or for forming.

A further advantageous variant of the cutting tool according to the invention is to provide the front cutting edge with a cutting edge section which runs beyond the drill axis and which forms an angle κ of 5°-20° with a perpendicular to the drill axis. With a configuration of this type, cutting edge fractures in the center of the cutting tool are avoided without a disruptive center pip remaining in the base of the bore. Furthermore, when interchangeable cutting inserts are used for the cutting head, an enlarged supporting surface for the cutting insert and therefore greater stability of the cutting tool is achieved.

The invention may be implemented not only on a cutting tool with a cutting head formed in one piece with the drill shank but, particularly advantageously, also in the case of cutting tools in which the cutting head is formed by an interchangeable cutting insert.

In this case, in particular for smaller bore diameters in the range from about 4 to 8 mm, the cutting head of the cutting tool will be formed in one piece with the drill shank, while for larger bore diameters from about 10 mm, the cutting head will as a rule be formed by an interchangeable reversible cutting plate, which achieves greater economy of the cutting tool.

In the case of cutting tools in which the cutting head is formed by an interchangeable cutting insert, cutting inserts with a substantially square or rectangular outline having two projecting sections which are located opposite each other in inverted mirror-image fashion have been found to be particularly advantageously worthwhile. If cutting inserts of this type are used, the possible use of the cutting tool can be doubled by rotating the cutting insert and using a new cutting edge, and therefore the economy can be improved further.

In the following text, the invention will be explained in more detail by using figures, in which:

DESCRIPTION OF THE PREFERRED EMBODIMENTS

Figure 1:
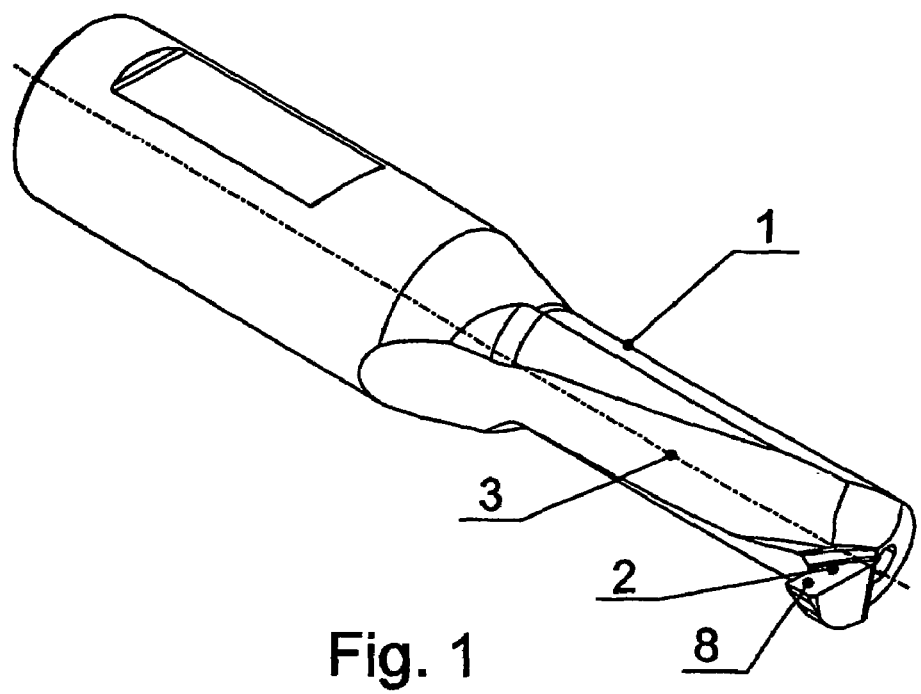
FIG. 1 shows a cutting tool according to the invention in an oblique view
Figure 2:
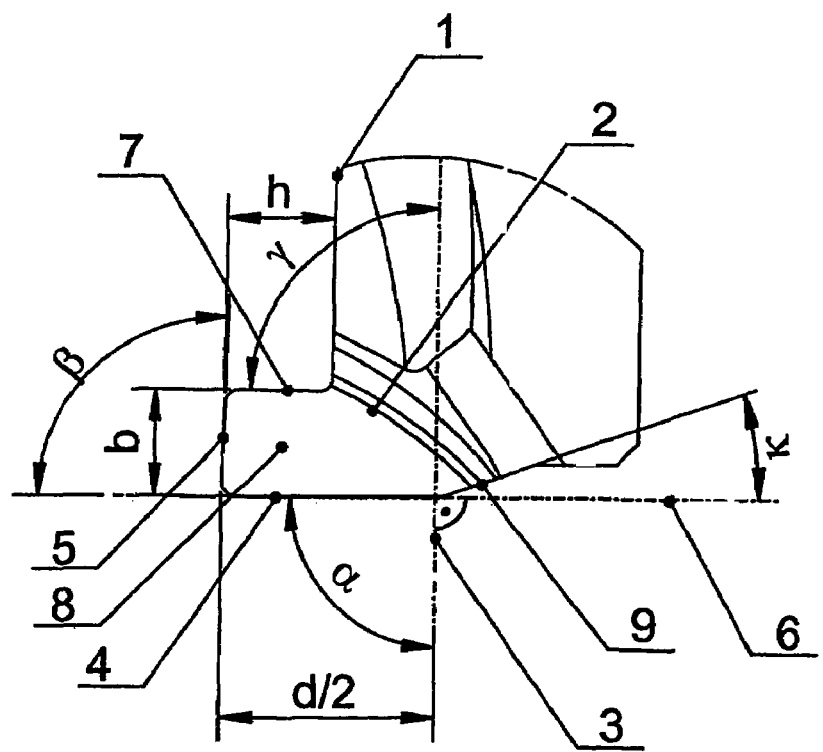
FIG. 2 shows the enlarged cutting head of the cutting tool according to FIG. 1 in plan view

FIG. 1 illustrates a cutting tool according to the invention for boring into solid material. In this specific embodiment, the cutting head 2 is produced in one piece with the shank 1 from hard metal. The specific embodiment of the cutting head 2 can be seen in detail from FIG. 2. The cutting head 2 has a section 8 which projects laterally from the drill shank 1 with a height h which is 25% of the drill diameter and a width b which is 25% of the drill diameter. The ratio of height h to width b is 1:1.

The end of the cutting head 2 is formed as a front cutting edge 4, which runs continuously straight as far as the drill axis 3 of the cutting tool and forms an angle $\alpha$ of 89.5° with the drill axis 3. Beyond the drill axis 3, the front cutting edge 4 merges into an angled cutting section 9, which forms an angle $\kappa$ of 20° with a perpendicular 6 to the drill axis 3. The projecting section 8 of the cutting head 2 has at the side a straight cutting edge 5, which cuts the wall of the bore during boring. The lateral cutting edge 5 forms an angle $\beta$ of 91° with the perpendicular 6 to the drill axis 3. The lateral cutting edge 5 merges into a straight rear cutting edge 7, which runs approximately parallel to the front cutting edge 4 and forms an angle $\gamma$ of 89° with the drill axis 3.

Figure 3:
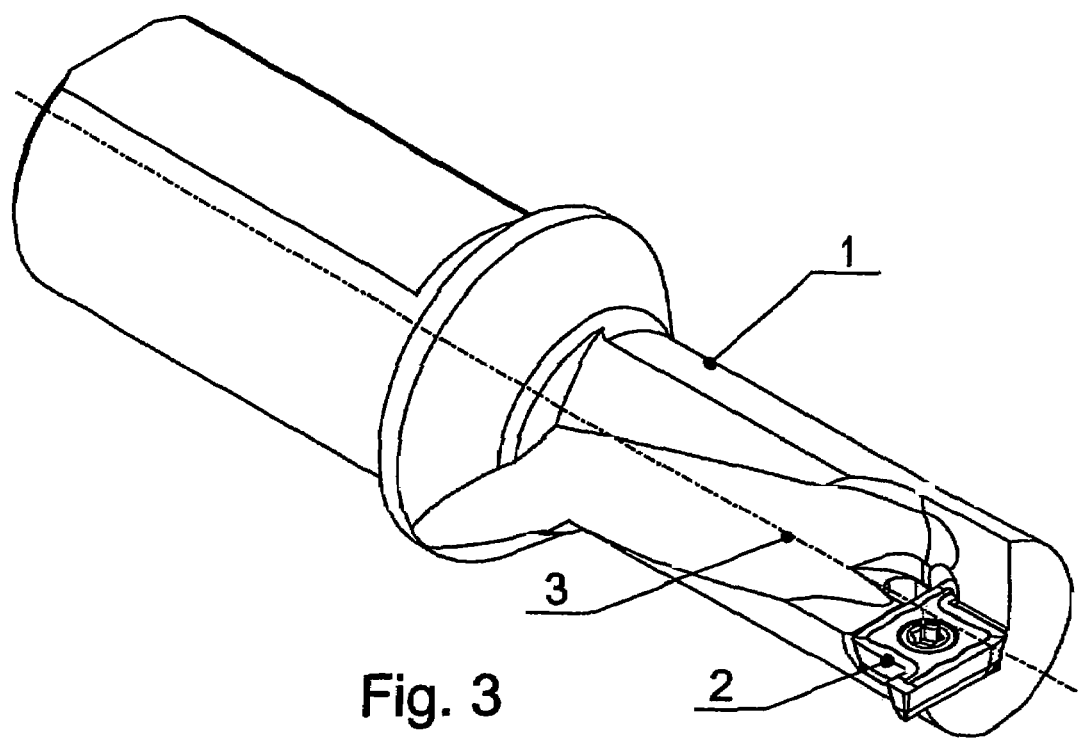
FIG. 3 shows the variant of a cutting tool according to the invention in an oblique view
Figure 4:
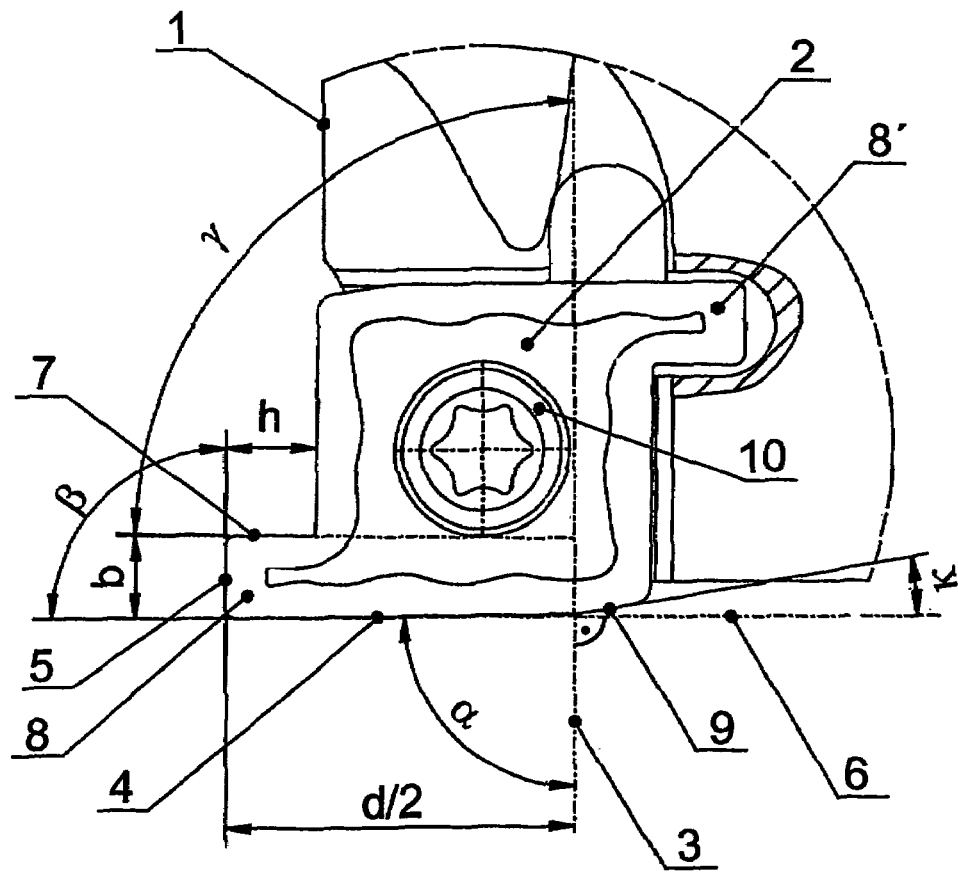
FIG. 4 shows the enlarged cutting head of the cutting tool according to FIG. 3 in plan view.

FIGS. 3 and 4 show a variant of a cutting tool according to the invention in which the cutting head 2 is formed as a reversible cutting plate with an approximately square outline and two projecting sections 8, 8' located opposite each other in an inverted mirror-image fashion. The individual cutting edges 4, 5 and 7 are formed in a manner comparable with the corresponding cutting edges 4, 5 and 7 of the embodiment according to FIGS. 1 and 2. By loosening the fixing screw 10 and rotating the reversible cutting plate through 180°, the second projecting section 8' is brought into use. In the embodiment illustrated, the second section 8' has the same cutting edges 4, 5 and 7 as the section 8. However, it is likewise conceivable for the second section 8' to have cutting edges configured in another way.

We claim:

1. A cutting tool for turning and boring into solid material, comprising:
    a drill shank defining a drill axis and having an end;
    a cutting head disposed at said end and having a straight, front cutting edge running substantially transversely with respect to said drill axis, said front cutting edge being disposed to cut as far as said drill axis and enclosing therewith an angle $\alpha$ of less than 90°, and an adjacent straight lateral cutting edge for cutting a wall of a bore, said lateral cutting edge enclosing an angle $\beta$ of more than 90° with a perpendicular to said drill axis and merging into a straight, rear cutting edge running substantially transversely with respect to said drill axis;
    said lateral cutting edge being formed on a section of said cutting head projecting from said drill shank by a height h having a value between 5% and 40% of a drill diameter d and having a width b having a value between 5% and 40% of the drill diameter d, and a ratio of the height h to the width b lying in a range from substantially 1:0.7 to 1:1.3, and said rear cutting edge enclosing an angle $\gamma$ of less than 90° with said drill axis.

2. The cutting tool according to claim 1, wherein said section projects from said drill shank by a height h having a value between 5% and 30% of said drill diameter and by a width b having a value between 10% and 30% of said drill diameter.

3. The cutting tool according to claim 1, wherein said front cutting edge runs continuously straight, at least as far as said drill axis.

4. The cutting tool according to claim 1, wherein said front cutting edge encloses an angle $\alpha$ of about 89.5° with said drill axis.

5. The cutting tool according to claim 1, wherein said lateral cutting edge encloses an angle $\beta$ with the perpendicular to said drill axis, and said angle $\beta$ is substantially 91°.

6. The cutting tool according to claim 1, wherein said rear cutting edge encloses an angle $\gamma$ of about 89° with said drill axis.

7. The cutting tool according to claim 1, wherein said front cutting edge has a cutting edge section beyond said drill axis enclosing an angle $\kappa$ of between 5° and 20° with the perpendicular to said drill axis.

8. The cutting tool according to claim 1, wherein said interchangeable cutting insert is formed as a reversible cutting plate with a substantially rectangular outline formed with two projecting sections disposed opposite each other in an inverted mirror-image relationship.

9. The cutting tool according to claim 8, wherein said rectangular outline is a substantially square outline.

10. In combination with a cutting tool according to claim 1, a cutting insert configured for mounting to the cutting tool.

* * * * *